(12) United States Patent
Lee (10) Patent No.: US 10,891,852 B1
(45) Date of Patent: Jan. 12, 2021

(54) PRECISE PREDICTIVE MAINTENANCE METHOD FOR DRIVING UNIT

(71) Applicant: ITS CO., LTD., Ulsan (KR)

(72) Inventor: Young Kyu Lee, Ulsan (KR)

(73) Assignee: ITS CO., LTD., Ulsan (KR)

( * ) Notice: Subject to any disclaimer, the term of this patent is extended or adjusted under 35 U.S.C. 154(b) by 0 days.

(21) Appl. No.: 17/019,295

(22) Filed: Sep. 13, 2020

Related U.S. Application Data (63) Continuation of application No. PCT/KR2018/015287, filed on Dec. 4, 2018.

(30) Foreign Application Priority Data

Mar. 14, 2018 (KR) .................. 10-2018-0029593

(51) Int. Cl.
*G11B 20/18* (2006.01)
*G08B 31/00* (2006.01)
*G08B 21/18* (2006.01)

(52) U.S. Cl.
CPC .......... *G08B 31/00* (2013.01); *G08B 21/182* (2013.01)

(58) Field of Classification Search
CPC ....... G08B 31/00; G08B 21/182; G08B 20/18
See application file for complete search history.

(56) References Cited

U.S. PATENT DOCUMENTS

2014/0219071 A1  8/2014 Takata

FOREIGN PATENT DOCUMENTS

| JP | 2003-280707 A | 10/2003 |
| JP | 2012-083721 A | 4/2012 |
| KR | 10-0856301 B1 | 9/2008 |
| KR | 10-2011-0072123 A | 6/2011 |
| KR | 10-1643599 B1 | 7/2016 |

OTHER PUBLICATIONS

International Search Report issued in PCT/KR2018/015287; dated Mar. 11, 2019.

*Primary Examiner* — An T Nguyen
(74) *Attorney, Agent, or Firm* — Studebaker & Brackett PC (57) ABSTRACT

The present invention relates to a precise predictive maintenance method for a driving unit and a configuration thereof includes a first base information collecting step S10 of collecting change information of an energy size; a second base information collecting step S20 of collecting energy values; a setting step S30 of setting an alarm upper limit and an alarm lower limit for the energy values; and a detecting step S40 of measuring energy values and detecting the driving unit to be an abnormal state.

3 Claims, 11 Drawing Sheets

PRECISE PREDICTIVE MAINTENANCE METHOD FOR DRIVING UNIT

CROSS-REFERENCE TO RELATED APPLICATIONS

The present application is a continuation of International Patent Application No. PCT/KR2018/015287, filed on Dec. 4, 2018, which is based upon and claims the benefit of priority to Korean Patent Application No. 10-2018-0029593, filed on Mar. 14, 2018. The disclosures of the above-listed applications are hereby incorporated by reference herein in their entirety.

TECHNICAL FIELD

The present invention relates to a precise predictive maintenance method for a driving unit, and more particularly to, a precise predictive maintenance method for a driving unit which measures and collects energy values for two or more arbitrary time zones set in driving information of a driving unit in a normal state and driving information of the driving unit before a malfunction is generated and sets an alarm upper limit and an alarm lower limit for the time zone set based on the collected information and an alarm gradient value to compare the energy values for two or more arbitrary time zones collected in real time by the driving of the driving unit and a gradient value with the alarm upper limit, the alarm lower limit, and the alarm gradient value to issue an alarm when a suspected abnormal condition of the driving unit is satisfied and induce the driving unit to be repaired or replaced at a right time to prevent a huge loss caused by the malfunction of the driving unit in advance.

BACKGROUND ART

Generally, stable driving is very important for a driving unit (for example, a motor, a pump, a conveyer, and a compressor) used for an automation process of equipment.

For example, hundreds of driving units are installed in the facilities of a large-scale transfer factory to continuously transfer materials to be transferred while interlocking with each other. If any one of the plurality of driving units is broken, a tremendous situation in which the entire operation of the facilities is stopped may occur.

In this case, due to the down-time caused by the malfunction of the driving unit, a huge loss may be caused by not only the repair cost of the driving unit, but also the operating cost which is wasted while the facilities are stopped and the business effect.

According to the recent data of the Ministry of Employment and Labor and the Korea Occupational Safety and Health Agency, the total number of casualties resulting from annual industry safety accidents is estimated to be about 100,000 and when it is converted into the cost, it is estimated that 18 trillion won is lost annually.

As a way to avoid such unexpected down-time costs, it is urgent to introduce a preliminary predictive maintenance system. Even though there was an effort to improve the problems in the name of predictive maintenance, for more effective predictive maintenance, it is necessary to develop a more advanced predictive maintenance method.

DISCLOSURE

Technical Problem

The present invention is proposed to solve the problems as described above and an object of the present invention is to provide a precise predictive maintenance method for a driving unit which measures and collects energy values for two or more arbitrary time zones set in driving information of a driving unit in a normal state and driving information of the driving unit before a malfunction is generated and sets an alarm upper limit and an alarm lower limit for the time zone set based on the collected information and an alarm gradient value to compare the energy values for two or more arbitrary time zones collected in real time by the driving of the driving unit and a gradient value with the alarm upper limit, the alarm lower limit, and the alarm gradient value to issue an alarm when a suspected abnormal condition of the driving unit is satisfied and induce the driving unit to be repaired or replaced at a right time, to prevent a huge loss caused by the malfunction of the driving unit in advance.

Further, another object is to provide a precise predictive maintenance method for a driving unit which presents various detection conditions in order to search for various abnormal signs which may occur in the driving unit and issues an alarm to the user when the detection conditions are satisfied to not only easily detect various abnormal signs generated in the driving unit, but also ensure an excellent reliability for a detection result.

Technical Solution

According to an aspect of the present invention, a precise predictive maintenance method for a driving unit includes: a first base information collecting step S10 of collecting change information of an energy size in accordance with a time measured in a normal driving state of a driving unit by arbitrarily setting at least two or more time zones from the change information of the energy size and collecting energy values of the set arbitrary time zones, a second base information collecting step S20 of collecting energy values of the same arbitrary time zones as in the first base information collecting step S10 from change information of an energy size in accordance with a time measured in a driving state of the driving unit before a malfunction of the driving unit is generated; a setting step S30 of setting an alarm upper limit and an alarm lower limit for the energy values of the arbitrary time zones set based on the information collected in the base information collecting steps S10 and S20; and a detecting step S40 of measuring energy values of the arbitrary time zones set in the change information of the energy size in accordance with the time measured in the real-time driving state of the driving unit and detecting the driving unit to be an abnormal state when the measured energy value exceeds the alarm upper limit set in the setting step S30 or is lower than the alarm lower limit, and an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

Further, in the first base information collecting step S10, the change information of the energy size in accordance with the time measured in the driving state is divided into n equal parts by an arbitrary time interval and the equal parts are sequentially designated by first, second, third, . . . and n-th and then two or more of first to n-th parts are arbitrarily selected to set arbitrary time zones.

Further, in the change information of the energy size in accordance with the time of the driving unit collected in the base information collecting steps S10 and S20, a driving period including energy values for arbitrarily set two or more time zones is repeatedly formed. In the first base information collecting step S10, energy values for two or more time zones of the driving period in the normal driving state of the driving unit and two or more energy values of repetitive another driving period are connected and in this case, the energy values in the same time zone are connected to collect gradient information for each of the energy values of two or more time zones between the driving periods, in the second base information collecting step S20, energy values for two or more time zones of the driving period in the driving state of the driving unit before the malfunction of the driving unit is generated and two or more energy values of repetitive another driving period are connected and in this case, the energy values in the same time zone are connected to collect gradient information for each of the energy values of two or more time zones between the driving periods, in the setting step S30, an alarm gradient value for each of the energy values of two or more time zones between the driving periods is set based on the gradient information collected in the base information collecting steps S10 and S20, and in the detecting step S40, when an average gradient value for the energy values of two or more time zones between the driving periods measured with the interval of unit times set in the real-time driving state of the driving unit exceeds an alarm gradient value in the corresponding time zone set in the setting step S30, the driving unit is detected to be an abnormal state, and the unit time is set to include at least two driving periods.

Further, a period between a starting point and an ending point is set with the starting point when an energy value of the driving unit exceeds the set offset value and the ending point when the energy value of the driving unit falls below the offset value as the driving period to extract the repetitive driving period or the change information of the energy size in accordance with the time of the driving unit is forcibly divided in accordance with the set peak interval and the divided period is set as the driving period to extract the repetitive driving period.

Advantageous Effects

According to the present invention, the precise predictive maintenance method for a driving unit measures and collects energy values for two or more arbitrary time zones set in driving information of a driving unit in a normal state and driving information of the driving unit before a malfunction is generated and sets an alarm upper limit and an alarm lower limit for the time zone set based on the collected information and an alarm gradient value to compare the energy values for two or more arbitrary time zones collected in real time by the driving of the driving unit and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied, thereby not only easily detecting various abnormal signs generated in the driving unit, but also ensuring an excellent reliability for a detection result.

BEST MODE

The present invention relates to a precise predictive maintenance method for a driving unit and a configuration thereof includes: a first base information collecting step S10 of collecting change information of an energy size in accordance with a time measured in a normal driving state of a driving unit by arbitrarily setting at least two or more time zones from the change information of the energy size and collecting energy values of the set arbitrary time zones, a second base information collecting step S20 of collecting energy values of the same arbitrary time zones as in the first base information collecting step S10 from change information of an energy size in accordance with a time measured in a driving state of the driving unit before a malfunction of the driving unit is generated; a setting step S30 of setting an alarm upper limit and an alarm lower limit for the energy values of the arbitrary time zones set based on the information collected in the base information collecting steps S10 and S20; and a detecting step S40 of measuring energy values of the arbitrary time zones set in the change information of the energy size in accordance with the time measured in the real-time driving state of the driving unit and detecting the driving unit to be an abnormal state when the measured energy value exceeds the alarm upper limit set in the setting step S30 or is lower than the alarm lower limit.

MODE FOR CARRYING OUT THE INVENTION

A precise predictive maintenance method for a driving unit according to an exemplary embodiment of the present invention will be described in detail based on the accompanying drawings. A detailed description of known functions and configurations determined to unnecessarily obscure the gist of the present invention will be omitted.

Figure 1:
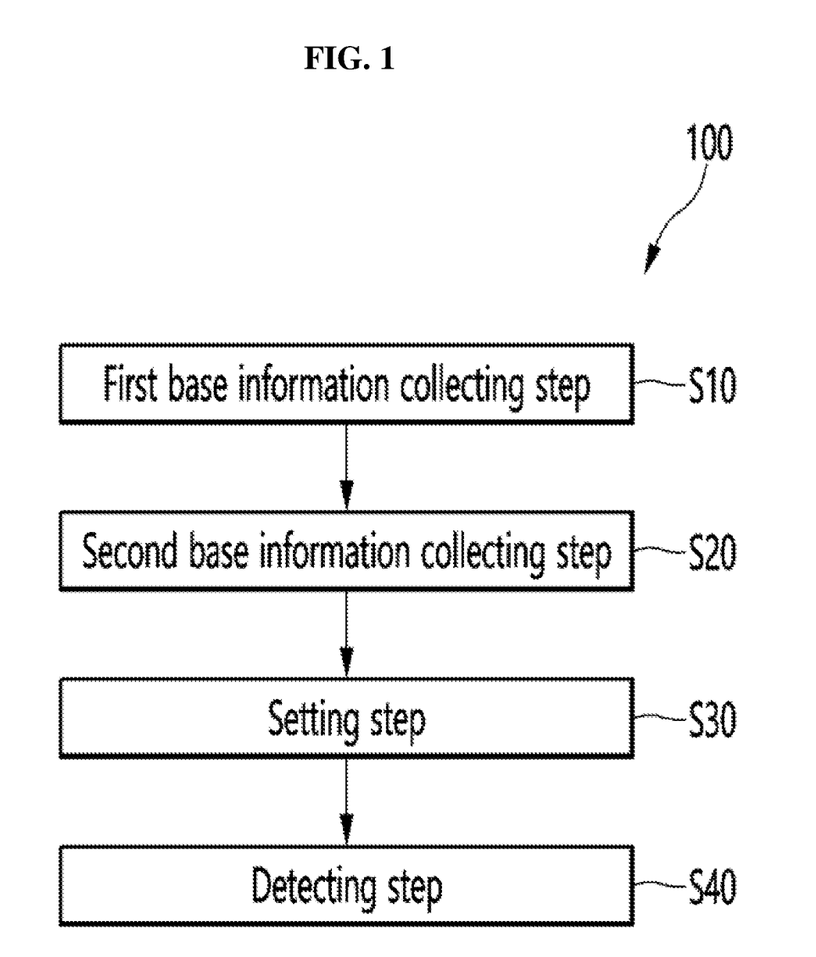
FIG. 1 is a block diagram of a precise predictive maintenance method for a driving unit according to an embodiment of the present invention.
Figure 2:
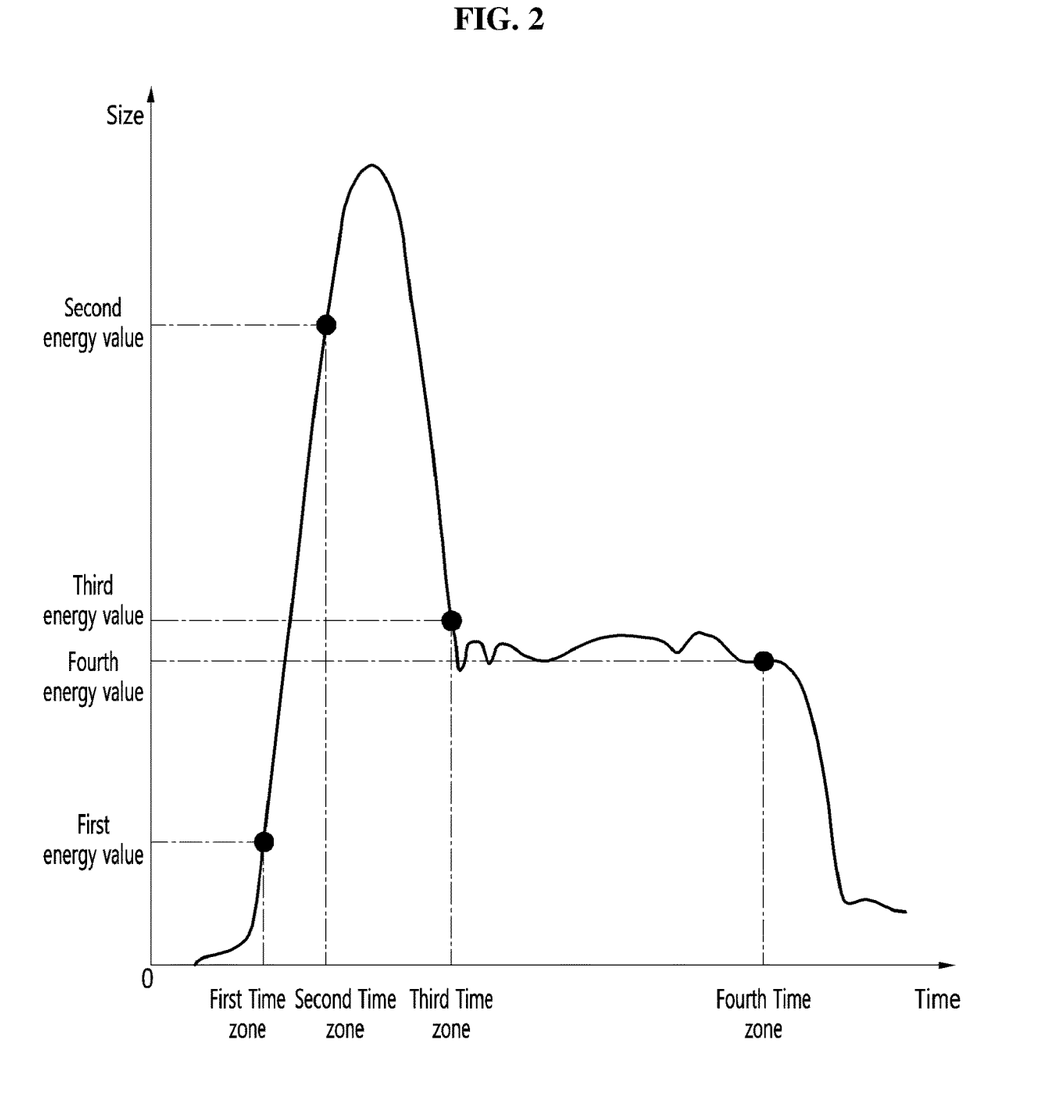
FIG. 2 is a view for extracting an energy value for an arbitrary time zone from a waveform for energy change information of a driving unit.
Figure 3:
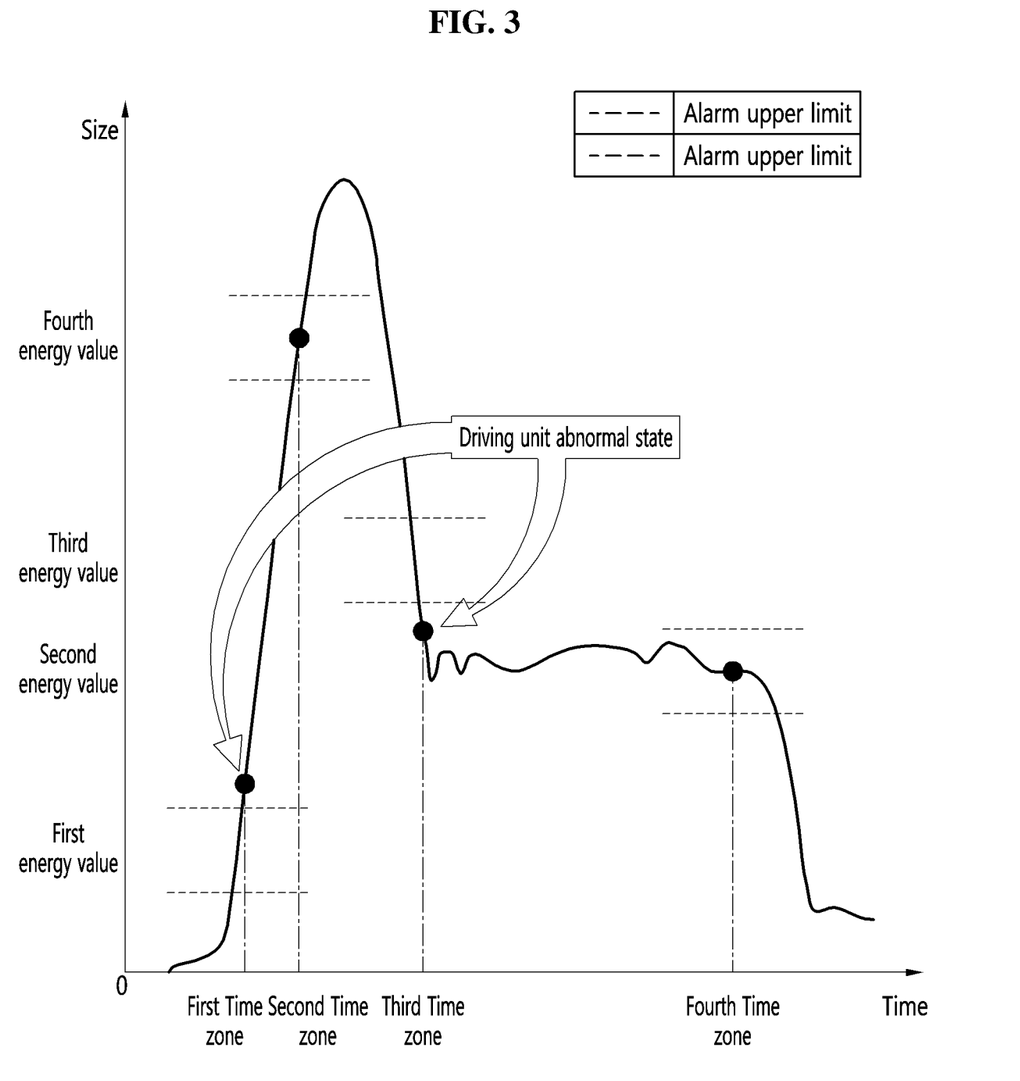
FIGS. 3 and 4 are views for detecting an abnormal state of a driving unit with an energy value of an arbitrary time zone of a waveform for energy change information of a driving unit.
Figure 4:
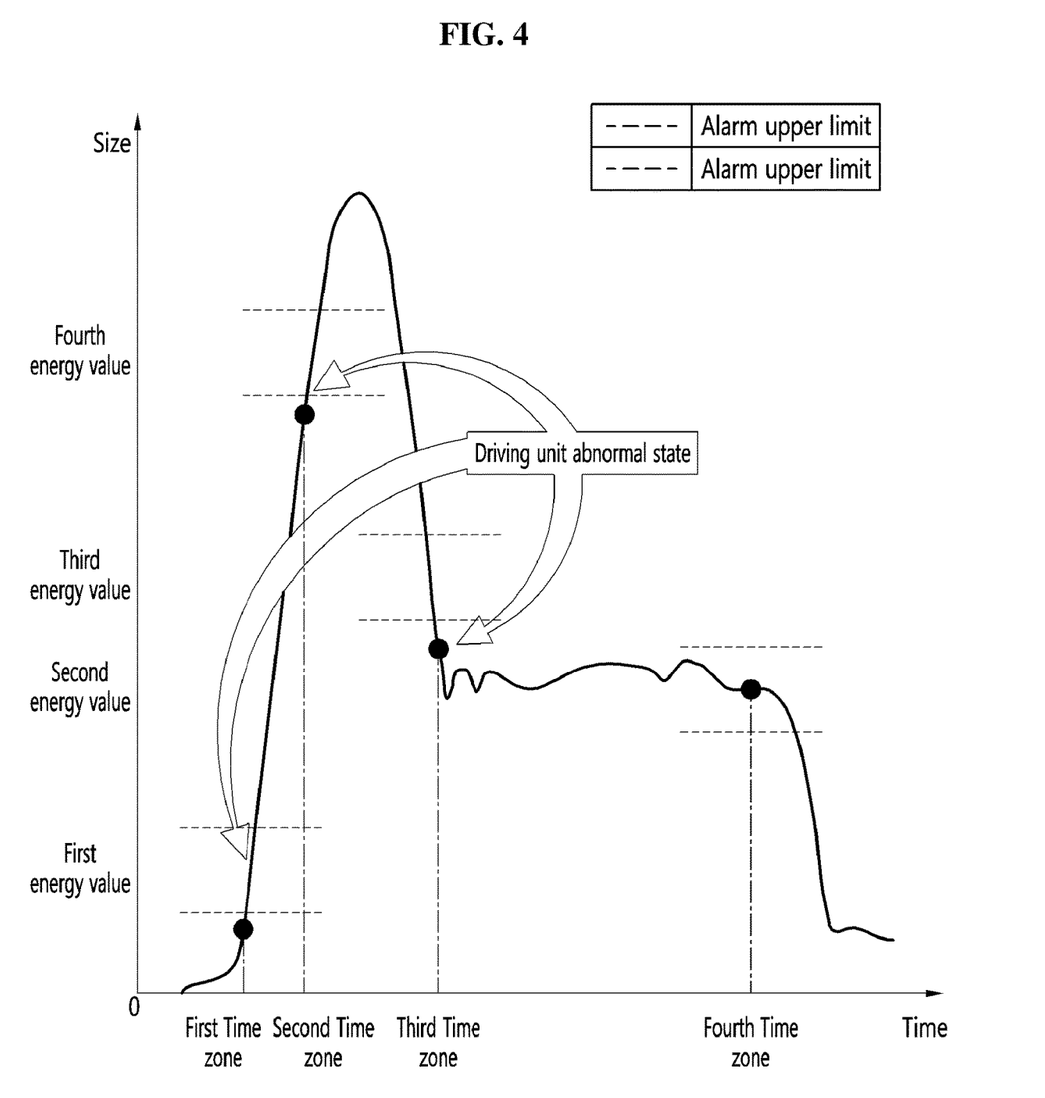
Figure 5:
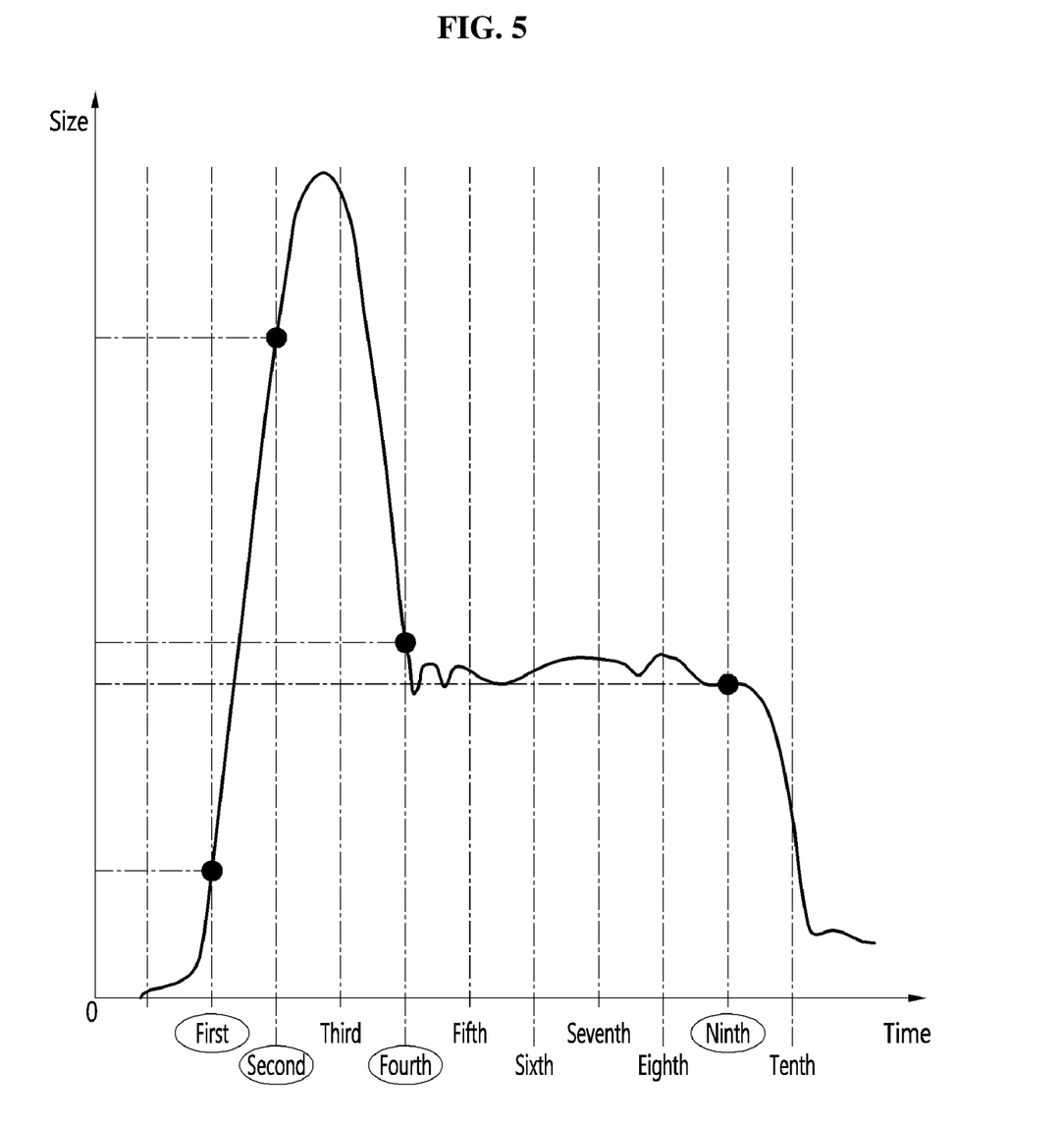
FIG. 5 is a view illustrating a waveform of energy change information measured in a driving state of a driving unit which is divided into 10 equal parts.
Figure 6:
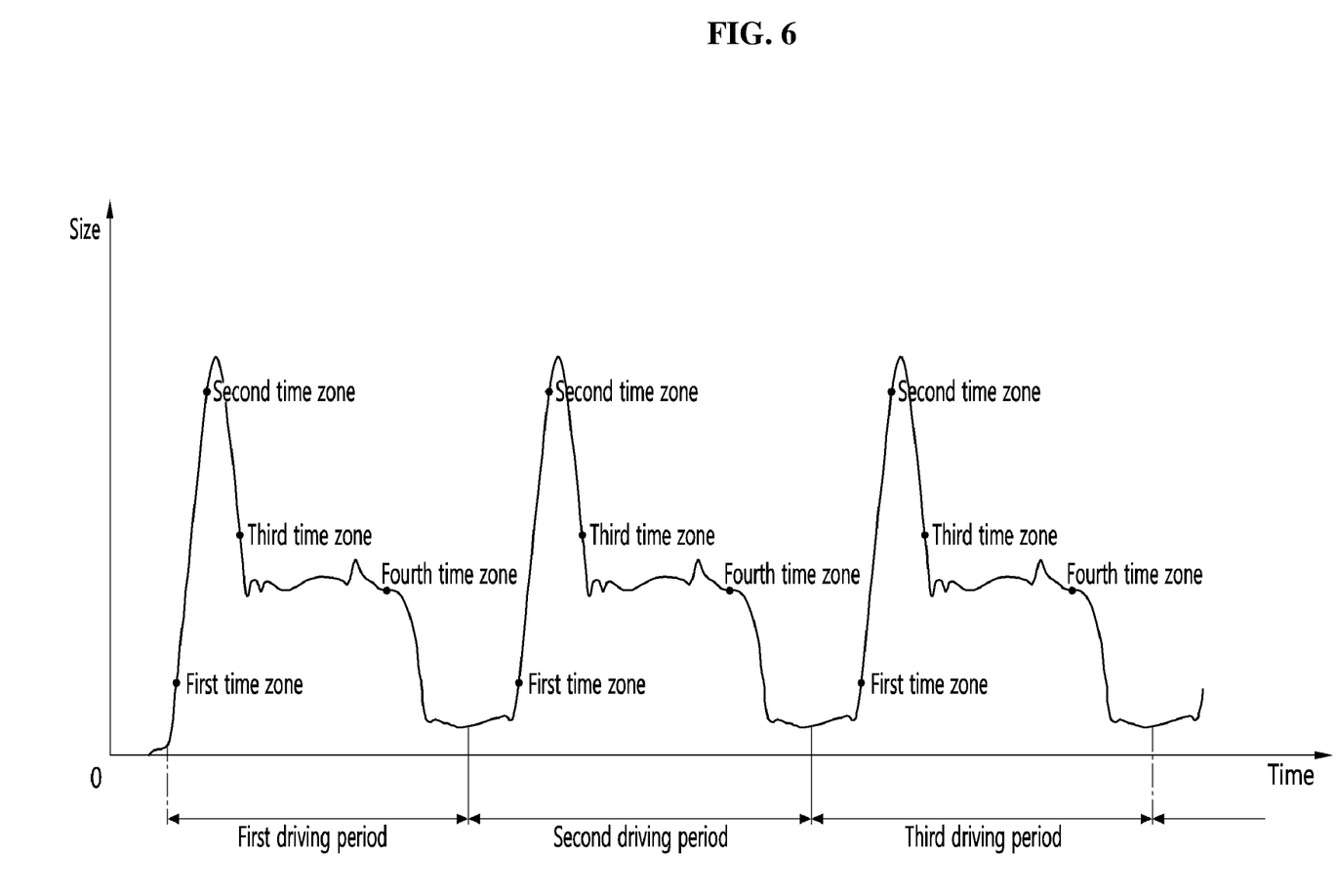
FIG. 6 is a view for extracting energy values for two or more arbitrary time zones from a repetitive driving period of a driving unit.
Figure 7:
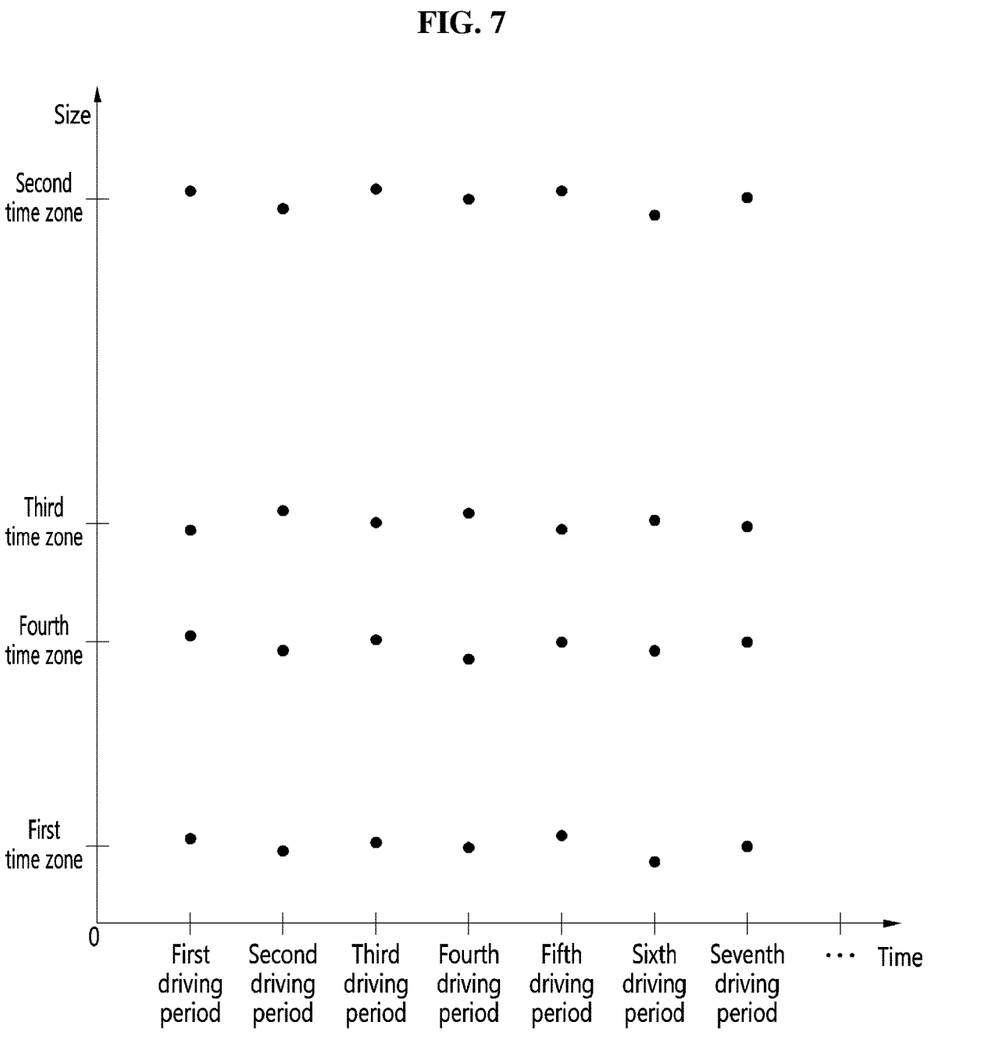
FIG. 7 is a view of representing an energy value of an arbitrary time zone illustrated in FIG. 6 by a numerical value.
Figure 8:
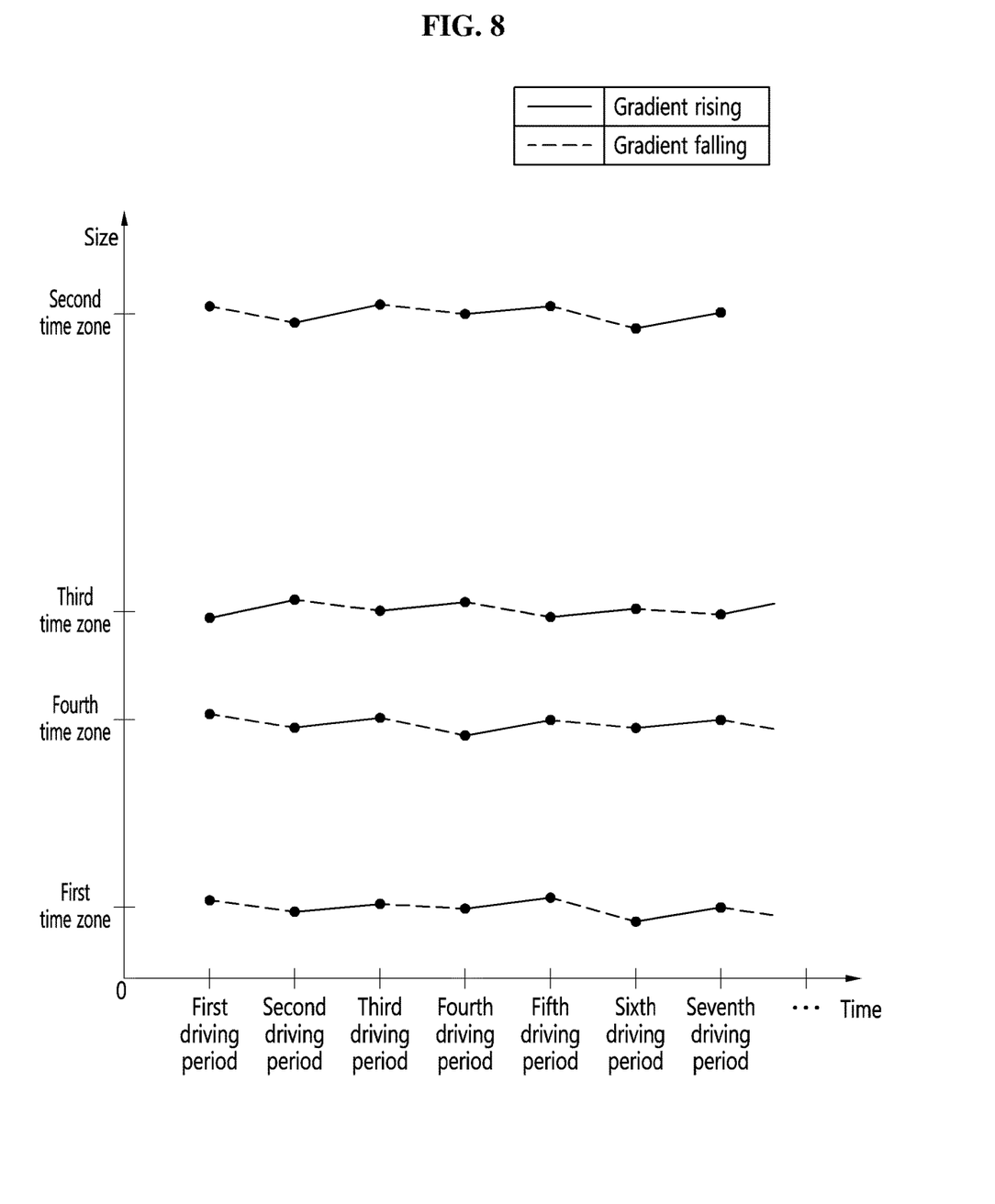
FIG. 8 is a view for extracting a gradient value based on an energy value of an arbitrary time zone illustrated in FIG. 7.
Figure 9:
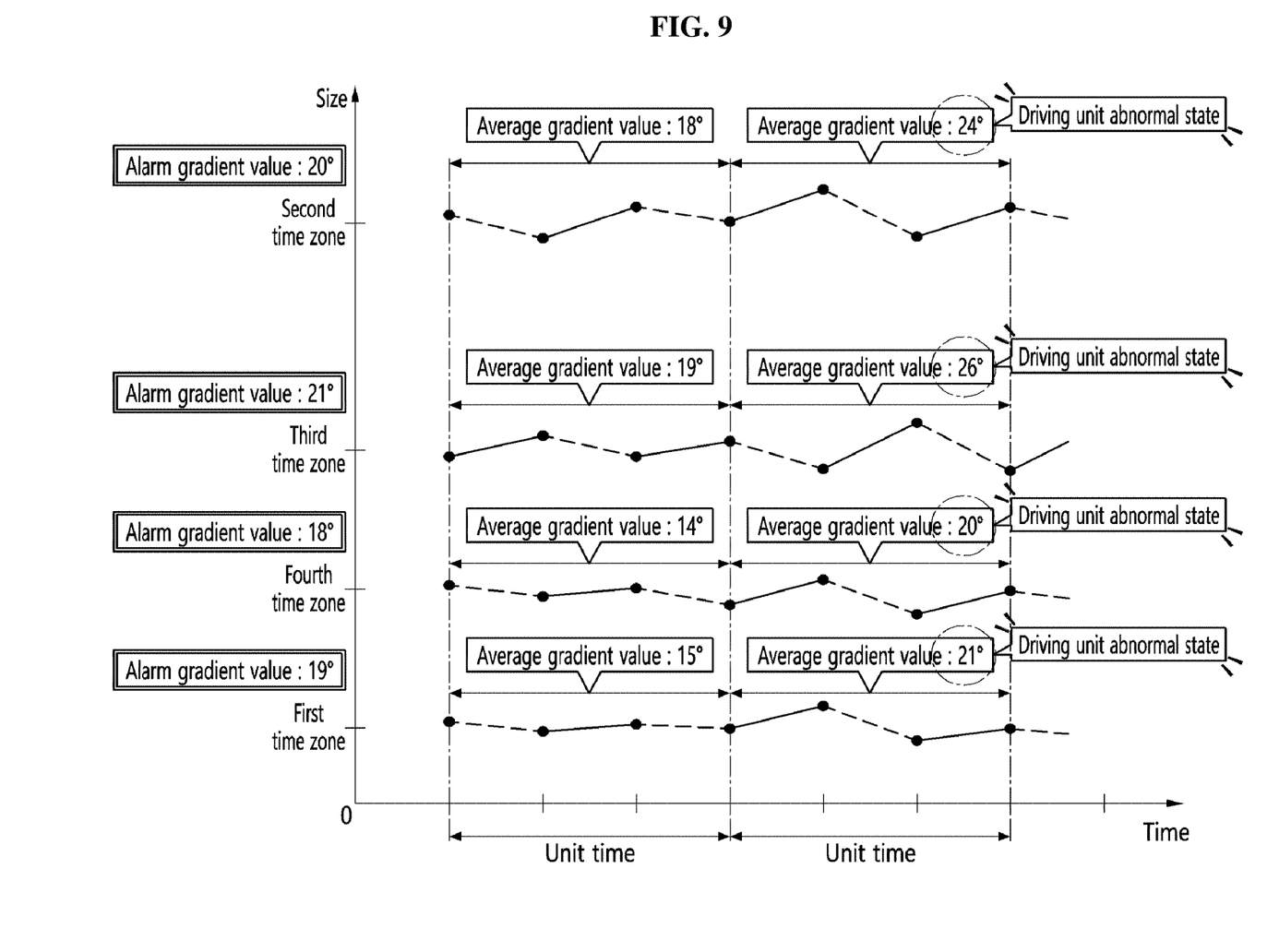
FIG. 9 is a view for extracting an average gradient value for the energy value between driving periods measured with an interval of unit times.
Figure 10:
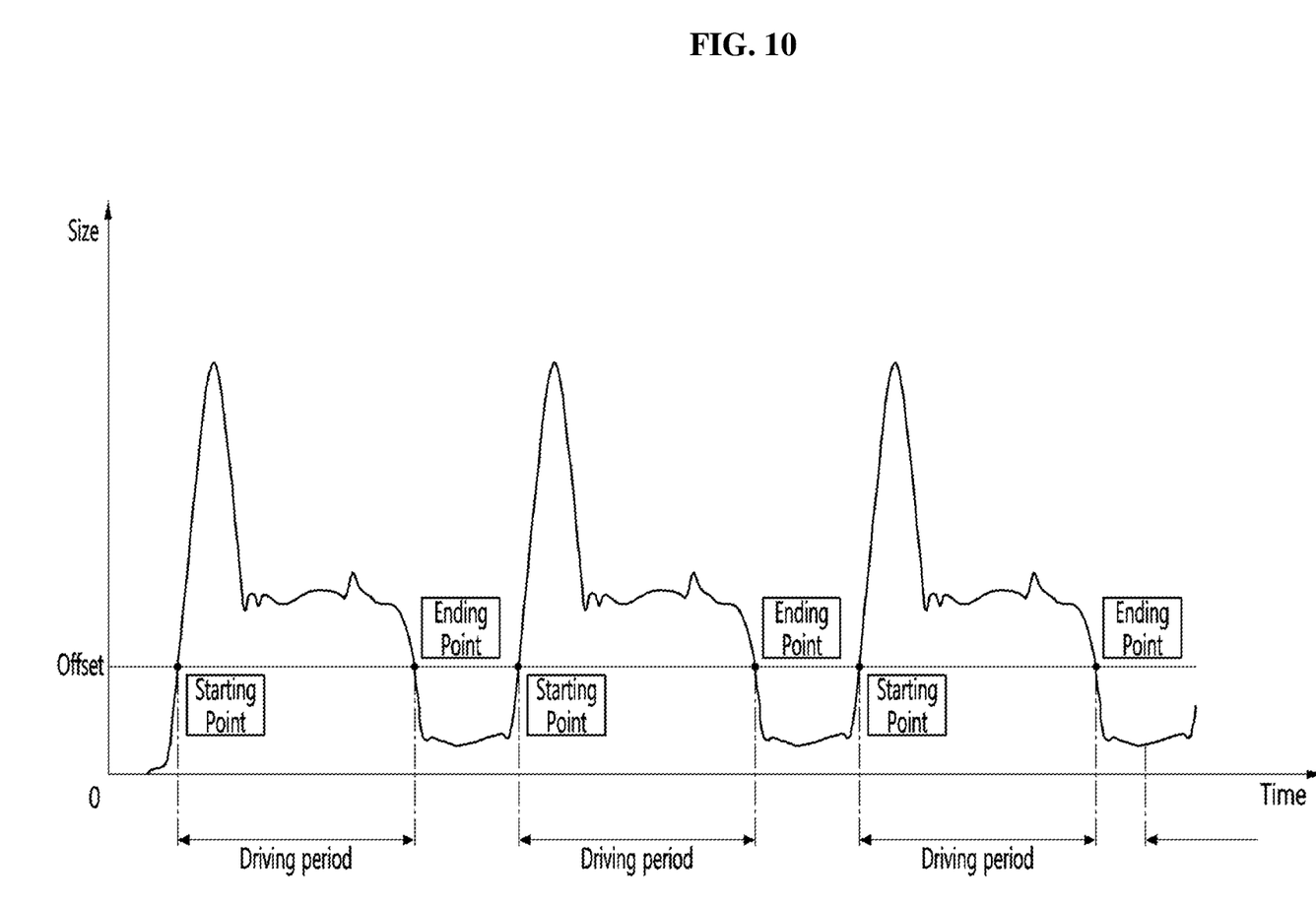
FIG. 10 is a view for extracting a driving period from a driving unit which is repeatedly driven and paused.
Figure 11:
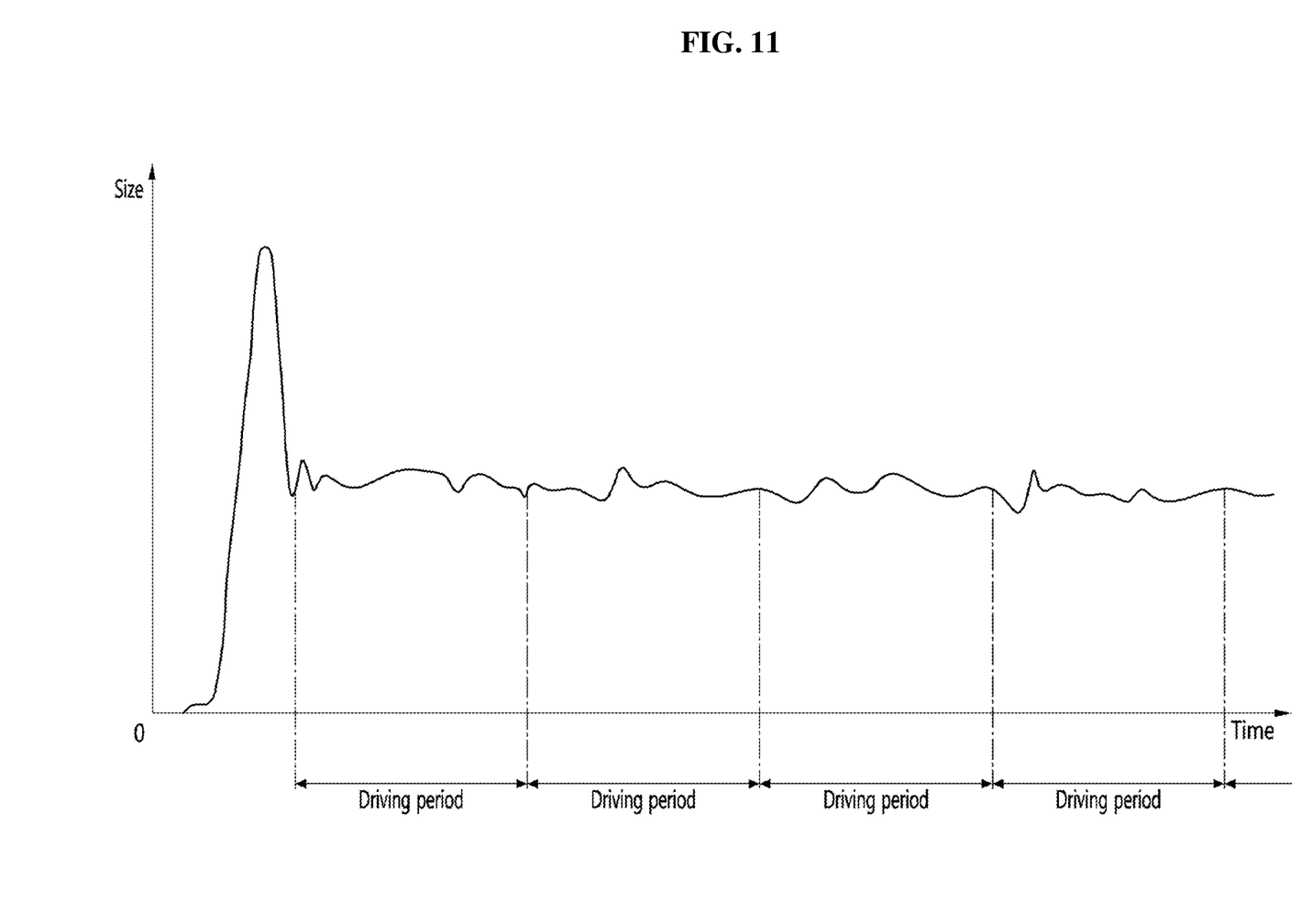
FIG. 11 is a view for extracting a driving period from a driving unit which is continuously driven.

FIGS. 1 to 11 illustrate a precise predictive maintenance method for a driving unit according to the exemplary embodiment of the present invention, in which FIG. 1 is a block diagram of a precise predictive maintenance method for a driving unit according to an embodiment of the present invention, FIG. 2 is a view for extracting an energy value for an arbitrary time zone from a waveform for energy change information of a driving unit, FIGS. 3 and 4 are views for detecting an abnormal state of a driving unit with an energy value of an arbitrary time zone of a waveform for energy change information of a driving unit, FIG. 5 is a view illustrating a waveform of energy change information measured in a driving state of a driving unit which is divided into 10 equal parts, FIG. 6 is a view for extracting energy values for two or more arbitrary time zones from a repetitive driving period of a driving unit, FIG. 7 is a view of representing an energy value of an arbitrary time zone illustrated in FIG. 6 by a numerical value, FIG. 8 is a view for extracting a gradient value based on an energy value of an arbitrary time zone illustrated in FIG. 7, FIG. 9 is a view for extracting an average gradient value for the energy value between driving periods measured with an interval of unit times, FIG. 10 is a view for extracting a driving period from a driving unit which is repeatedly driven and paused, and FIG. 11 is a view for extracting a driving period from a driving unit which is continuously driven.

As illustrated in FIG. 1, the precise predictive maintenance method 100 for a driving unit according to an embodiment of the present invention includes a first base information collecting step S10, a second base information collecting step S20, a setting step S30, and a detecting step S40.

A first base information collecting step S10 is a step of collecting change information of an energy size in accordance with a time measured in a normal driving state of a driving unit by arbitrarily setting at least two or more time zones from the change information of the energy size and collecting energy values of the set arbitrary time zones.

Here, when a current consumed to operate the driving unit is assumed as the energy of the driving unit, generally, a high current is requested at a timing when the driving of the driving unit starts and when the driving unit is stabilized, a constant range of energy values is continuously maintained so that a waveform as illustrated in FIG. 2 is obtained.

By doing this, as illustrated in FIG. 2, a user sets two or more arbitrary time zones in consideration of an environment or a condition in which the driving unit is used and extracts and collects an energy value for the set time zone. A method of setting the time zone as described above will be described in more detail below.

In the precise predictive maintenance method 100 for a driving unit according to the present invention, four time zones are arbitrarily set and a set energy value is extracted and collected. However, various numbers of arbitrary time zones may be set in consideration of the environment and the condition of the driving unit.

Here, in order to distinguish four time zones, the time zones are denoted by a first time zone, a second time zone, a third time zone, and a fourth time zone.

The information collected as described above becomes a base of various alarm values set to detect an abnormal sign of the driving unit in the setting step S30 and the detecting step S40 which will be described below.

In the meantime, an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit, but is not limited thereto.

The second base information collecting step S20 is a step of collecting energy values of the same arbitrary time zones as the first base information collecting step S10 from the change information of the energy size in accordance with the time measured in the driving state of the driving unit before the malfunction of the driving unit is generated.

The information collected as described above also becomes a base of various alarm values set to detect an abnormal sign of the driving unit in the setting step S30 and the detecting step S40 together with the information collected in the first base information collecting step S10.

The setting step S30 is a step of setting an alarm upper limit and an alarm lower limit for the energy values of the arbitrary time zones set based on the information collected in the base information collecting steps S10 and S20.

That is, the alarm upper limit and the alarm lower limit for the energy values of the arbitrary time zones set in the setting step S30 may also be set based on a value when a peak interval of the driving unit is abnormally changed before the malfunction of the driving unit is generated based on information collected in the base information collecting steps S10 and S20 for a long time, that is, a value when the energy value in the arbitrary time zone is abnormally changed in a situation such as deterioration, aging of the driving unit or load due to the jamming of the foreign material.

The detecting step S40 is a step of measuring energy values of the arbitrary time zones set in the change information of the energy size in accordance with the time measured in the real-time driving state of the driving unit and detecting the driving unit to be an abnormal state when the measured energy value exceeds the alarm upper limit set in the setting step S30 or is lower than the alarm lower limit.

That is, as illustrated in FIGS. 3 and 4, when each of the energy values in the first time zone to the fourth time zone measured in the real-time driving state of the driving unit exceeds the alarm upper limit or is formed to be lower than the alarm lower limit, the driving unit is detected to be an abnormal state to issue an alarm. Therefore, before the malfunction of the driving unit is generated, the driving unit is managed to be replaced or repaired in advance so that the economic loss to be caused by stopping the operation of the facilities due to the malfunction of the driving unit may be prevented in advance.

In the meantime, in the first base information collecting step S10, the change information of the energy size in accordance with the time measured in the driving state is divided into n equal parts by an arbitrary time interval and the equal parts are sequentially designated by first, second, third, . . . and n-th and then two or more of first to n-th parts are arbitrarily selected to set arbitrary time zones.

For example, as illustrated in FIG. 5, when the change information of the energy size in accordance with the time measured in the driving state of the driving unit is divided into 10 equal parts, the divided sections are distinguished by first, second, . . . tenth. The user may designate two or more of first to tenth parts in consideration of the usage environment and condition of the driving unit to set arbitrary time zones.

That is, as illustrated in FIG. 5, when the user selects first, second, third, and ninth sections, energy values for four time zones may be extracted and collected.

Accordingly, various arbitrary time zones may be systematically and clearly set and managed from the change information of the energy size in accordance with the time measured in the driving state of the driving unit.

Further, in the change information of the energy size in accordance with the time of the driving unit collected in the base information collecting steps S10 and S20, a driving period including energy values for arbitrarily set two or more time zones is repeatedly formed.

In the first base information collecting step S10, energy values for two or more time zones of the driving period in the normal driving state of the driving unit and two or more energy values of repetitive another driving period are connected and in this case, the energy values in the same time zone are connected to collect gradient information for each of the energy values of two or more time zones between the driving periods.

In the second base information collecting step S20, energy values for two or more time zones of the driving period in the driving state of the driving unit before the malfunction of the driving unit is generated and two or more energy values of repetitive another driving period are connected and in this case, the energy values in the same time zone are connected to collect gradient information for each of the energy values of two or more time zones between the driving periods.

In the setting step S30, an alarm gradient value for each of the energy values of two or more time zones between the driving periods is set based on the gradient information collected in the base information collecting steps S10 and S20.

In the detecting step S40, when an average gradient value for the energy value of the two or more time zones between the driving periods measured with the interval of unit times set in the real-time driving state of the driving unit exceeds an alarm gradient value of the corresponding time zone set in the setting step S30, the driving unit is detected to be the abnormal state and the unit time is set to include at least two driving periods.

That is, in the first base information collecting step S10, as illustrated in FIG. 6, the energy values for two or more time zones are collected in repetitive driving periods of the driving unit and the energy values for two or more time zones of the driving period are represented in accordance with the time. For the convenience of description, when the repetitive driving periods are sequentially defined as a first driving period, a second driving period, . . . and an n-th driving period, the energy value may be represented as illustrated in FIG. 7.

Here, as illustrated in FIG. 1, the description will be made with an example that four time zones are set in the driving period.

Thereafter, as illustrated in FIG. 8, energy values of the first time zone to the fourth time zone of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

By doing this, the gradient values for the first time zone to the fourth time zone may be collected and the information about the gradient value collected as described above is recognized as information indicating that the driving unit is stably driven in the normal state.

In the second base information collecting step S20, in the same manner as the first base information collecting step S10, gradient information for the energy values in the first time zone to the fourth time zone between the driving periods of the driving unit before the malfunction of the driving unit is generated is collected and in the setting step S30, an alarm gradient value for each of the energy values of the first to fourth time zones between the driving periods is set based on the gradient information collected in the base information collecting steps S10 and S20.

Therefore, in the detecting step S40, as illustrated in FIG. 9, when an average gradient value obtained by connecting the energy values of the first to fourth time zones between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, as the driving period, a period between a starting point and an ending point is set with the starting point when the energy value of the driving unit exceeds an offset value set in the setting step S30 and the ending point when the energy value falls below the offset value. By doing this, as illustrated in FIG. 10, a repetitive driving period may be clearly extracted from the driving unit which is repeatedly stopped and paused so that the predictive maintenance of the driving unit may be easily induced.

Moreover, even though the driving unit is paused and is not completely stopped, the offset value is set as illustrated in FIG. 10, so that the driving period of the driving unit may be forcibly extracted with a point when the energy value of the driving unit falls below the offset value as an ending point. Therefore, the predictive maintenance of the driving unit with various driving conditions may be easily induced.

Further, the repetitive driving period may be extracted by forcibly dividing the change information of the energy size in accordance with the time of the driving unit in accordance with a set peak interval and setting the divided period as the driving period.

That is, as illustrated in FIG. 11, when the driving unit is driven once, the driving unit is continuously driven without being paused so that the repetitive driving period cannot be extracted. Therefore, the mean period is forcibly divided in accordance with the peak interval set in the setting step S30 to extract a plurality of driving periods so that the predictive maintenance of the driving unit with various driving conditions may be easily induced.

The precise predictive maintenance method 100 for a driving unit which detects an abnormal sign of the driving unit by the above-described processes measures and collects energy values for two or more arbitrary time zones set in driving information of a driving unit in a normal state and driving information of the driving unit before a malfunction is generated and sets an alarm upper limit and an alarm lower limit for the time zone set based on the collected information and an alarm gradient value to compare the energy values for two or more arbitrary time zones collected in real time by the driving of the driving unit and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied, thereby not only easily detecting various abnormal signs generated in the driving unit, but also ensuring an excellent reliability for a detection result.

In the meantime, the precise predictive maintenance method 100 of the driving unit according to the embodiment of the present invention may also be implemented by a combination of various electronic devices and programs which are capable of collecting, detecting, comparing an energy value of the driving unit and issuing an alarm.

The present invention has been described with reference to the exemplary embodiment illustrated in the drawing, but the exemplary embodiment is only illustrative and the present invention is not limited thereto. Further, it would be appreciated by those skilled in the art that various modifications and equivalent exemplary embodiments may be made. Further, those skilled in the art may modify the present invention without departing from the spirit of the present invention. Accordingly, the scope of claiming the rights of the present invention is not defined within the scope of the detailed description, but may be limited by the following claims and the technical spirit thereof.

What is claimed is:

1. A precise predictive maintenance method for a driving unit, used for various facilities, the method comprising:
   a first base information collecting step S10 of collecting change information of an energy size in accordance with a time measured in a normal driving state of the driving unit by arbitrarily setting at least two or more time zones from the change information of the energy size and collecting energy values of the set arbitrary time zones;
   a second base information collecting step S20 of collecting energy values of the same arbitrary time zones as in the first base information collecting step S10 from change information of an energy size in accordance with a time measured in a driving state of the driving unit before a malfunction of the driving unit is generated;
   a setting step S30 of setting an alarm upper limit and an alarm lower limit for the energy values of the arbitrary time zones set based on the information collected in the first and second base information collecting steps S10 and S20; and
   a detecting step S40 of measuring energy values of the arbitrary time zones set in the change information of the energy size in accordance with the time measured in the real-time driving state of the driving unit and detecting the driving unit to be an abnormal state when the measured energy value exceeds the alarm upper limit set in the setting step S30 or is lower than the alarm lower limit,
   wherein an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

2. The precise predictive maintenance method for a driving unit of claim 1, wherein:
   in the change information of the energy size in accordance with the time of the driving unit collected in the first and second base information collecting steps S10 and S20, a driving period including energy values for arbitrarily set two or more time zones is repeatedly formed, in the first base information collecting step S10, energy values for two or more time zones of the driving period in the normal driving state of the driving unit and two or more energy values of repetitive another driving period are connected and in this case, the energy values in the same time zone are connected to collect gradient information for each of the energy values of two or more time zones between the driving periods,
   in the second base information collecting step S20, energy values for two or more time zones of the driving period in the driving state of the driving unit before the malfunction of the driving unit is generated and two or more energy values of repetitive another driving period are connected and in this case, the energy values in the same time zone are connected to collect gradient information for each of the energy values of two or more time zones between the driving periods,
   in the setting step S30, an alarm gradient value for each of the energy values of two or more time zones between the driving periods is set based on the gradient information collected in the first and second base information collecting steps S10 and S20, and
   in the detecting step S40, when an average gradient value for the energy values of two or more time zones between the driving periods measured with the interval of unit times set in the real-time driving state of the driving unit exceeds an alarm gradient value in the corresponding time zone set in the setting step S30, the driving unit is detected to be an abnormal state, and the unit time is set to include at least two driving periods.

3. The precise predictive maintenance method for a driving unit of claim 2, wherein the repetitive driving period is extracted by setting a period between a starting point and an ending point with the starting point when an energy value of the driving unit exceeds a set offset value and the ending point when the energy value falls below the offset value as the driving period or a repetitive driving period is extracted by forcibly dividing the change information of the energy size in accordance with the time of the driving unit in accordance with a set peak interval and setting the divided period as the driving period.

* * * * *